May 2, 1967  A. E. KRUG  3,316,998
INDEXABLE ROTATING JOINT FOR STETHOSCOPE
Filed Feb. 14, 1966

INVENTOR.
ALBERT E. KRUG
BY
Kane, Dalsimer, Kane & Smith
ATTORNEYS

United States Patent Office

3,316,998
Patented May 2, 1967

3,316,998
INDEXABLE ROTATING JOINT FOR
STETHOSCOPE
Albert E. Krug, Wyckoff, N.J., assignor to Becton, Dickinson and Company, Rutherford, N.J., a corporation of New Jersey
Filed Feb. 14, 1966, Ser. No. 527,369
7 Claims. (Cl. 181—24)

This invention relates to a stethoscope and, more particularly, to a stethoscope of the type having a plurality of microphones in a single body, such as a dual microphone stethoscope. Still more particularly, this invention relates to an indexable rotating joint for providing interchangeable engagement between one of the plurality of microphones and the listening device of the stethoscope.

Multi-microphone stethoscopes, especially dual microphone stethoscopes have long been known and various means have been provided for interchangeably engaging the various microphones with the listening device. Among the means employed to allow interchangeable engagement of the various microphones has been a rotating joint with a U-shaped spring holding a rotating tube and engaging slots along a cylindrical recess in the microphone body. This rotatable tube is connected to the sound tube of the stethoscope. Such a spring arrangement presents at least two problems. Since force must be utilized to rotate the tube so as to change its position with respect to the microphones, stress is applied to the spring in an abnormal fashion so that wear is excessive and breakage is likely. Further, since the spring must have sufficient force to engage the slots adjacent the cylindrical recess, insertion of the spring is difficult either originally, or for replacement upon breakage. Additionally, with the U-shaped spring type of arrangement, means must be provided along the tube to prevent axial movement of the tube within the cylindrical recess. This makes assembly of the device even more difficult.

It is an object of my invention to provide a means for forming an indexable rotating joint which is less subject to breakage than previous devices.

It is a further object of this invention to provide an indexable rotating joint which can be easily assembled or repaired.

Briefly, in accordance with the preferred embodiment of the present invention, an indexable rotating joint is provided for a stethoscope having a microphone body with a plurality of microphones. The dual microphone is the conventional structure having, for example, a bell-shaped microphone diametrically opposed to a diaphragm-type microphone in a single body. A first cylindrical recess is formed in the body and openings are provided, communicating with this recess, at the apexes of the cup of each microphone and are diametrically opposed around the recess. Into this cylindrical recess a tube is fitted, one end of the tube being attached to the sound tube of the stethoscope, the other end being fitted so as to provide for the indexable rotating joint. An opening is provided in the tube for alignment with the openings in the apexes of each of the microphone cups when the rotating tube is properly aligned. Openings are provided at the end of the rotating tube opposite that connected to the sound tube. Into these openings is placed a means for locking the rotating tube into predetermined positions. In the preferred embodiment, this means is a cylindrical rod of small diameter, the ends of which seat in indentations in the microphone body at the periphery of the cylindrical recess adjacent the rotating tube, these indentations being formed in a shoulder provided at the intersection of said first cylindrical recess and a second cylindrical recess of larger diameter which is in coaxial alignment with said first cylindrical recess. Advantageously, there is a pair of indentations for each position. The rotating tube is placed within the cylindrical recesses, slightly beyond the locking position, the locking means is inserted in the tube, and the tube is retracted to the locking position. A compression spring, such as a helical spring or compound disk spring, is inserted into a cap which can be press fitted into the second cylindrical recess of the microphone body opposite the end through which the rotatable tube is inserted. Alternatively, the second cylindrical recess can be threaded and the cap screwed into place. This cap, with the spring in place, is inserted into the second cylindrical recess so as to compress the spring against either the rotatable tube or the locking means. Preferably, the rotatable tube is sized so as to allow entry into the cap in a telescopic relation. This entry aids in confining the spring within the cap chamber and may prevent distortion of the spring and its entry into the space formed between the rotatable tube and the cap. However, if desired, the cap and rotatable tube may be so sized as to prevent entry of the tube into the cap.

To move the rotatable tube into the opposite position, the tube is depressed against the spring, in the direction of the cap, and rotated. The pressure can be released as soon as the tube has been rotated slightly so as to unseat the locking means, and when the tube reaches the opposite position, the locking means will be forcibly depressed into the indentations in the microphone body by the action of the spring. The indentations are so spaced as to provide for alignment between the opening in the rotatable tube and one of the openings in the apexes of the cups of the microphones when the locking means is seated.

These and other objects and advantages of the present invention will be more clearly understood when considered in conjunction with the accompanying drawings, showing the preferred embodiment, in which.

Figure 1:
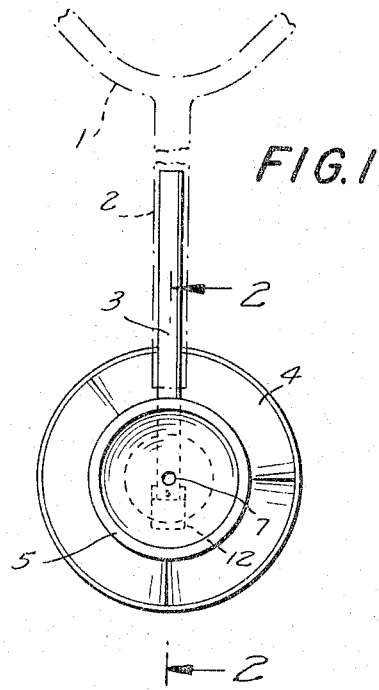
FIG. 1 is an elevation view of the stethoscope viewed from the bell-microphone, partially showing in phantom the sound tube and the Y-tube of the listening device and the indexable rotating joint.
Figure 2:
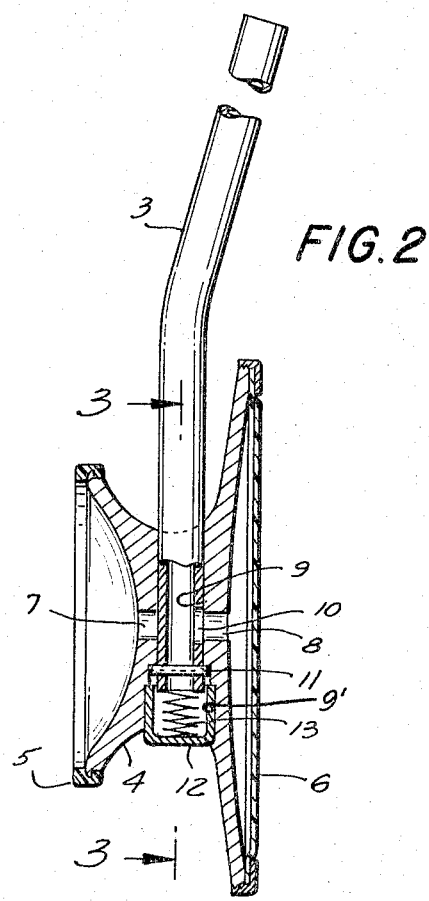
FIG. 2 is a transverse sectional, partial view, enlarged taken along the line 2—2 of FIG. 1, of the dual microphone with the rotating tube.
Figure 3:
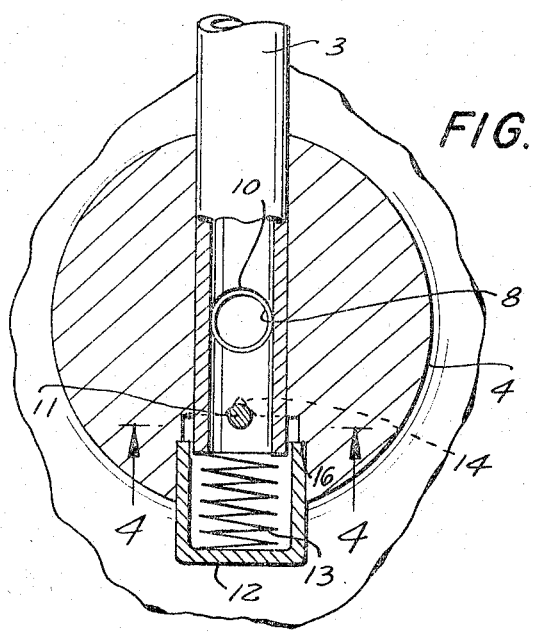
FIG. 3 is a sectional view of the indexable rotating joint taken along the line 3—3 of FIG. 2.

As best shown in FIGS. 1–3, a listening device, such as a pair of ear tubes (not shown), is connected through a Y-tube to a sound tube 2. A rotatable tube 3 is connected to the opposite end of the sound tube, the lower end of the rotatable tube being secured to a dual microphone body 4.

The dual microphone has a bell-shaped microphone 5 diametrically opposed to a diaphragm microphone 6. An opening 7 is provided at the apex of the bell-shaped microphone and an opening 8 at the apex of the diaphragm microphones, communicating with the first cylindrical recess 9 provided in the microphone body. An opening 10 is provided in the rotatable tube for interchangeable alignment with either of the openings 7 or 8.

A locking means 11 is inserted through the rotatable tube for engagement with the indentations in the microphone body formed in the shoulder 16. A cap 12 is fitted into the microphone body in a larger second cylindrical recess 9', which is in coaxial alignment with said first cylindrical recess, to force a compression spring 13 against the end of the rotatable tube so as to force seating of the locking means into the indentations in the microphone body.

In FIG. 3 an indentation 14 is shown in which the locking means is seated. While the indentation is shown in a triangular configuration, it is, of course, obvious that other configurations can also be employed, such as semicircular or square.

Figure 4:
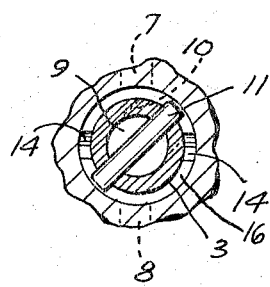
FIG. 4 is a detailed fragmentary view taken along the line 4—4 of FIG. 3.

An enlarged view of the locking means and indentations is shown in FIG. 4 taken along the line 4—4 of FIG. 3. In this figure, the locking means is shown unseated from the indentations provided in the microphone body.

In use, the rotatable tube is turned so that the opening in the tube is aligned with one of the openings in the microphone cups, for example, the diaphragm microphone. When it is then desired to employ the bell-shaped microphone, the tube is depressed slightly and turned until the locking means are again engaged in the indentations in the microphone body. The opening in the tube is then aligned with the bell-shaped microphone and the stethoscope is ready for use with this microphone.

While a specific embodiment of the invention has been shown and described, it should be understood that many variations are possible. An important feature is the cap holding the compression spring against the rotatable tube. The presence of this cap provides both for easier assembly and easy repair of the device.

What I claim as new and desire to secure by Letters Patent of the United States is:

1. In a stethoscope having a microphone body with a plurality of microphones, a first cylindrical recess in the center of said microphones, and having openings in the apexes of the cups of the microphones communicating with said first recess, a second cylindrical recess of larger diameter in coaxial alignment with said first recess, the improvement comprising:
    (a) a rotatable tube located within said recesses, one end of said tube being connected to the sound tube of said stethoscope,
    (b) an opening in said rotatable tube for interchangeable alignment with the openings in said microphone cups,
    (c) locking means inserted within said rotatable tube at the end opposite that connected to said sound tube,
    (d) indentations in said body, provided in a shoulder formed by said first cylindrical recess and said second cylindrical recess, for seating said locking means to provide for alignment of said rotatable tube opening with one of said microphone cup openings,
    (e) a compression spring in contact with the end of said rotatable tube near said locking means, and
    (f) a cap inserted in said second recess forcing said spring against said rotatable tube.

2. The stethoscope of claim 1 wherein said microphone body has two diametrically opposed microphones.

3. The stethoscope of claim 1 wherein the opening in said rotatable tube is along the side.

4. The stethoscope of claim 1 wherein a pair of indentations is provided for each position.

5. The stethoscope of claim 1 wherein the locking means is a cylindrical rod.

6. The stethoscope of claim 1 wherein the rotatable tube is sized to enter the cap.

7. The stethoscope of claim 4 wherein said indentations are formed with sloping sides.

References Cited by the Examiner

UNITED STATES PATENTS

| 1,775,204 | 9/1930 | Lucarelle | 181—24 |
| 2,513,827 | 7/1950 | Tynan | 181—24 |
| 2,719,594 | 10/1955 | Smithline | 181—24 |
| 2,722,989 | 11/1955 | Tynan | 181—24 |

STEPHEN J. TOMSKY, *Primary Examiner.*